Patented Dec. 21, 1943

2,337,422

UNITED STATES PATENT OFFICE 2,337,422

PREPARATION OF NITRILES FROM PRIMARY ALCOHOLS

Le Roy U. Spence, Elkins Park, and Robert N. Washburne and Darrel J. Butterbaugh, Philadelphia, Pa., assignors to Röhm and Haas Company, Philadelphia, Pa., a corporation of Delaware No Drawing. Application October 7, 1941, Serial No. 413,973

8 Claims. (Cl. 260—464)

This invention relates to a catalytic process for the preparation of aliphatic and aryl-aliphatic nitriles from primary alcohols and ammonia. An object of this invention is to produce improved yields of aliphatic and aryl-aliphatic nitriles from primary alcohols and ammonia by reacting same in the presence of catalysts. A further object is to provide an improved process for the reaction by the use of copper catalysts in conjunction with dehydrating catalysts.

According to Hara and Komatzu, Mem. Coll. Sci. Kyoto Imp. Univ., 8A, 241-6 (1925) nitriles may be formed to varying extents when primary alcohols and dry ammonia are slowly passed over reduced copper at 300°–350° C. Yields of nitriles as high as 80% were obtained in some instances from n-propyl, isobutyl, and isoamyl alcohols. In other cases the yields were as low as 40%; and it was determined that the yield was dependent upon the method of preparing the catalyst.

Like catalytic reactions in general, the reaction of alcohols and ammonia is dependent on the choice of a specific catalyst and on the maintenance of proper conditions of operation. As is often the case in catalysis, the catalysts of the prior art lose their activity after a relatively short time and thereupon become relatively ineffective. An object of this invention is to provide an improved process for the manufacture of nitriles by the use of catalysts which have higher activity and greater stability than those heretofore considered useful for such purpose, thus assuring greater catalytic effectiveness over a longer period of time. This is accomplished by having present in the catalyst one or more dehydrating oxides such as $Al_2O_3$, $ZrO_2$, $TiO_2$, $ThO_2$, $CeO_2$ and other rare earth oxides. The first four oxides above-mentioned are particularly effective in yielding high conversions of the alcohols to the nitriles. All of the oxides, however, stabilize the copper catalyst and prevent rapid loss of activity. As is known in the art, the dehydrating oxides are partially dehydrated, amorphous products formed by loss of water from the so-called hydrous oxides. This is referred to in copending application Serial No. 413,972, filed of even date herewith. Other materials of value, particularly for use as carriers, include clays containing hydrated aluminum silicate, such as kaolin and fuller's earth, and diatomaceous earth. Individual oxides or mixtures of oxides with or without carriers are included in the scope of this invention.

The dehydrating oxide may be co-precipitated with copper hydroxide, or it may be separately prepared and coated with the precipitated copper hydroxide, or it may be impregnated with a solution of a decomposable copper salt such as the nitrate or acetate which is then ignited to copper oxide and later reduced to the metal. Any of the numerous methods, known in the art of preparation of dehydrating oxides, may be employed. Aluminum oxide, for example, may be used in the form of the commercially available "Activated Alumina," or it may be precipitated from aluminum nitrate with ammonia from hot or cold dilute solutions, or it may be made by hydrolysis of aluminum alcoholates.

The copper is preferably derived from the nitrate or acetate rather than from the sulfate. Copper catalysts produced from the sulfate are to be avoided since they tend to retain traces of sulfate which become reduced to the sulfide during the reaction which in turn serves to poison the catalyst. The oxide of copper produced by drying the precipitated hydroxide may be reduced before use or during the reaction of the alcohol and ammonia, inasmuch as hydrogen is one of the products of the catalytic reaction. Precipitation of the copper hydroxide is not necessary, however, in order to obtain an active catalyst since the oxide produced by the ignition of the copper nitrate or acetate yields equally good results. The proportion of copper to dehydrating oxide can be varied over a wide range without seriously affecting the yield.

Although the catalyst may become inactive on continued use, presumably due to a deposit which covers the active surfaces, it may be reactivated readily by a passage of air over the catalyst at temperatures within the range of 300–400° C., this being the range of temperatures used for the conversion of the alcohols and ammonia to nitriles. This operation partially converts the copper to the oxide, which can then be reduced to the metal either before reuse by means of hydrogen from an extraneous source, or during resuse by the hydrogen resulting from the subsequent alcohol-ammonia reaction.

The temperature range within which our process is preferably carried out is 300 to 400° C. although such process is not inoperable at somewhat lower or higher temperatures.

More complete conversion of the alcohol to the nitrile is accomplished by having present an excess of ammonia over the alcohol. Although the nitrile can be formed in the presence of an excess of alcohol, this method is less satisfactory than when the ammonia is in excess due to the fact that the excess alcohol forms constantboiling mixtures with the produced nitrile. By using an excess of ammonia in the reaction mixture, the crude nitrile can be purified easily by distillation inasmuch as the amount of unconverted alcohol is very small. Obviously the recovered excess ammonia and unconverted alcohol can be returned to the catalytic reaction zone for further reaction.

Saturated aliphatic primary alcohols containing two or more crabon atoms may be converted to the nitriles with very high resultant yield by reacting them with ammonia at 300 to 400° C. in the presence of a copper catalyst containing one or more dehydrating oxides. Examples of such alcohols include ethyl alcohol, normal propyl alcohol, n-butanol, isobutanol, 2-ethyl butanol, n-hexanol, 2-ethyl hexanol, n-octanol, etc. Likewise arylaliphatic primary alcohols such as benzyl alcohol, phenylethyl alcohol, etc. may be used. Unsaturated primary alcohols may be used but the saturated nitrile is obtained by reaction with the hydrogen formed in the reaction. The higher-boiling primary alcohols may be vaporized initially under reduced pressure; and likewise the reaction may be carried out at reduced pressure.

In the following examples, which serve to illustrate but not to limit the invention, the term "space velocity" means liters of total vapor (calculated at standard conditions) per liter of catalyst per hour.

The first four examples serve to illustrate the very low yields obtainable with copper catalysts which do not contain a dehydrating oxide.

Example 1

Copper turnings were oxidized to copper oxide and reduced with hydrogen a number of times to produce an active surface. The following results were obtained in making isobutyronitrile by passing isobutyl alcohol and an excess of ammonia over this catalyst in the temperature range of 350–370° C.

| Hours run | Space velocity | Yield of nitrile |
|---|---|---|
|  |  | Per cent |
| 1.0 | 199 | 10.9 |
| 3.0 | 196 | 2.9 |

The catalyst had slight activity at first, but a longer run, after burning off and reducing again, gave a poorer yield because of the loss of catalytic activity during the run.

Example 2

Yellow brass chips, which were oxidized and reduced a number of times to give an active surface, gave the following results when used as catalysts in the preparation of isobutyronitrile from isobutyl alcohol and ammonia.

| Hours run | Space velocity | Yield of nitrile |
|---|---|---|
|  |  | Per cent |
| 1.0 | 183 | 9.2 |
| 3.0 | 201 | 14.2 |

Example 3

Pumice (4–8 mesh) was washed with hot nitric acid to remove soluble impurities and was then washed with water and dried. The pumice was then impregnated with a solution of copper nitrate and the mixture dried and heated to 350° C. in a stream of air to convert the nitrate to the oxide. The copper oxide was then reduced to copper by reaction with hydrogen at 360° C. and contained 27% copper by weight. Results with this catalyst in the preparation of isobutyronitrile are here recorded. After each run, the catalyst was burned off with air and reduced with hydrogen to reconvert the catalyst to maximum activity at the start of each new run.

| Hours run | Space velocity | Yield of nitrile |
|---|---|---|
|  |  | Per cent |
| 1.0 | 200 | 47.1 |
| 2.9 | 200 | 23.1 |

Example 4

"Tabular Corundum," which is a crystalline form of aluminum oxide and which has no activity as a dehydrating catalyst, was used as another typical inactive support for a copper catalyst. This was impregnated with a copper nitrate solution and converted to copper as in Example 3. In this case, however, the final catalyst contained 12% copper by weight. The catalyst was burned off between runs. In preparing isobutyronitrile from isobutyl alcohol and ammonia using the catalyst as described above, the following results were obtained:

| Hours run | Space velocity | Yield |
|---|---|---|
|  |  | Per cent |
| 2.0 | 200 | 31.6 |
| 2.8 | 200 | 17.4 |

This catalyst was slightly less active than copper on pumice (Example 3), perhaps because of its lower copper content, and it also lost activity after a short usage as evidenced by the declining rate of evolution of hydrogen.

The following example shows the improved results obtained when a catalyst comprising copper and a dehydrating oxide is used in the preparation of isobutyronitrile from isobutyl alcohol and ammonia.

Example 5

"Activated Alumina" (4–8 mesh) was impregnated with copper nitrate solution and converted to reduced copper in the same manner as used in Examples 3 and 4. In the same way the catalyst was burned off between runs.

| Hours run | Copper in catalyst | Space velocity | Yield |
|---|---|---|---|
|  | Per cent |  | Per cent |
| 3.0 | 8.5 | 200 | 89.0 |
| 3.0 | 15.0 | 200 | 90.5 |
| 4.0 | 15.0 | 400 | 91.5 |
| 7.8 | 15.0 | 400 | 91.0 |

Note that this catalyst not only gave much better yields than catalysts heretofore known but also could be used at much higher space velocities. It also retained its activity for greater lengths of time than the previously known catalysts which have been suggested for this reaction.

Example 6

Finely divided fuller's earth, which is a moderately active dehydrating catalyst, was suspended in a solution of copper nitrate. The copper hydroxide was then precipitated with ammonia.

The mixture was then filtered and washed free of salts. The filter cake was dried, broken into 4–8 mesh particles and then reduced to the metal with hydrogen. When used in the conversion of isobutyl alcohol and ammonia, the following yields of isobutyronitrile were obtained.

| Hours run | Space velocity | Yield |
|---|---|---|
| | | Per cent |
| 3.0 | 200 | 82.7 |
| 3.0 | 200 | 86.5 |

The effect of varying the composition of the catalysts and the use of various oxides is illustrated by Example 7.

*Example 7*

Co-precipitated catalysts, made in the presence of diatomaceous earth, were prepared by precipitation of the hydroxides by the action of ammonia on a solution of the mixed nitrates. Precipitation was followed by filtering, washing, drying, and reduction as in Example 6. Following is the tabulation of results in the preparation of isobutyronitrile:

| Composition of catalyst | Hours run | Space velocity | Yield |
|---|---|---|---|
| | | | Per cent |
| 33% copper alone | 3.0 | 200 | 79.6 |
| 60% copper, 6% $Al_2O_3$ | 2.9 | 147 | 94.0 |
| 33% copper, 33% $Al_2O_3$ | 3.0 | 200 | 93.6 |
| 60% copper, 7% $TiO_2$ | 2.6 | 150 | 84.5 |
| 60% copper, 7% $ThO_2$ | 2.5 | 150 | 88.8 |
| 33% copper, 33% $CeO_2$ | 2.5 | 200 | 77.5 |
| 33% copper, 33% $ZrO_2$ | 3.0 | 200 | 94.9 |
| 33% copper, 33% rare earth oxides | 3.0 | 200 | 85.0 |

Inasmuch as copper supported on diatomaceous earth alone produced a yield of 79.6% at 200 space velocity, it is apparent that the oxide of cerium had little or no positive effect. However, it was observed that this oxide did serve to prevent the rapid loss of activity of the catalyst.

Thus, the oxides which have positive merit in conjunction with copper include the oxide of aluminum in group III of Mendeléeff's periodic arrangement of the elements, the oxides of the metals in group IV-A, and the rare earth oxides.

*Example 8*

That this invention relates to the production of nitriles from primary alcohols in general is indicated in the following tabulation of the results of catalytically converting various alcohols to corresponding nitriles. All runs were carried out at 360° C., with a space velocity of 200 and a ratio of ammonia to alcohol of 1.5 to 1.

| Catalyst used | Alcohol | Hours run | Yield |
|---|---|---|---|
| | | | Per cent |
| Cu-$Al_2O_3$-diatomaceous earth | n-Propanol | 3.0 | 82.1 |
| Cu-activated alumina | do | 3.0 | 79.8 |
| Do | Isobutanol | 3.0 | 90.8 |
| Cu-$Al_2O_3$-diatomaceous earth | n-Butanol | 3.0 | 92.1 |
| Cu-activated alumina | n-Hexanol | 3.0 | 91.0 |
| Do | 2-ethyl butanol | 3.0 | 92.5 |
| Do | 2-ethyl hexanol | 3.5 | 79.4 |
| Do | Benzyl alcohol | 2.8 | 54.4 |

We claim:

1. A method for preparing aliphatic nitriles from corresponding alcohols which comprises passing a mixture of ammonia and the vapors of a primary aliphatic alcohol of at least two carbon atoms over a catalyst of reduced copper dispersed on a partially dehydrated, amorphous, hydrous oxide of a metal selected from the class consisting of aluminum, zirconium, titanium, thorium, and the rare earth metals maintained at a temperature of about 300° to about 400° C.

2. A method for preparing aliphatic nitriles from corresponding alcohols which comprises passing a mixture of ammonia and the vapors of a primary aliphatic alcohol of at least two carbon atoms over a catalyst of reduced copper dispersed on a partially dehydrated, amorphous, hydrous oxide of aluminum maintained at a temperature of about 300° to about 400° C.

3. A method for preparing aliphatic nitriles from corresponding alcohols which comprises passing a mixture of ammonia and the vapors of a primary aliphatic alcohol of at least two carbon atoms over a catalyst of reduced copper dispersed on a partially dehydrated, amorphous, hydrous oxide of a metal selected from the class consisting of aluminum, zirconium, titanium, thorium, and the rare earth metals maintained at a temperature of about 300° to about 400° C., said oxide being supported on a carrier.

4. A method for preparing aliphatic nitriles from corresponding alcohols which comprises passing a mixture of ammonia and the vapors of a primary aliphatic alcohol of at least two carbon atoms over a catalyst of reduced copper dispersed on a partially dehydrated, amorphous, hydrous oxide of a metal selected from the class consisting of aluminum, zirconium, titanium, thorium, and the rare earth metals maintained at a temperature of about 300° to about 400° C., said oxide being supported on diatomaceous earth.

5. A method for preparing aliphatic nitriles from corresponding alcohols which comprises passing a mixture of ammonia and the vapors of a primary aliphatic alcohol of at least two carbon atoms over a catalyst of reduced copper dispersed on a partially dehydrated, amorphous, hydrous oxide of aluminum supported on diatomaceous earth and maintained at a temperature of about 300° to about 400° C.

6. A method for preparing isobutyronitrile from isobutyl alcohol which comprises passing a mixture of ammonia and the vapors of isobutyl alcohol over a catalyst of reduced copper dispersed on activated alumina at a temperature of about 300° to about 400° C.

7. A method of preparing aliphatic nitriles from corresponding alcohols which comprises passing a mixture of about one and a half mols of ammonia with about one mol of the vapors of a primary aliphatic alcohol of at least two carbon atoms over a catalyst of reduced copper dispersed on a partially dehydrated, amorphous, hydrous oxide of a metal selected from the class consisting of aluminum, zirconium, titanium, thorium, and the rare earth metals maintained at about 300° to about 400° C.

8. A method for preparing isobutyronitrile from isobutyl alcohol which comprises passing a mixture of about one and a half mols of ammonia with about one mol of the vapors of isobutyl alcohol over a catalyst of reduced copper dispersed on activated alumina on diatomaceous earth maintained at about 300° to about 400° C.

LE ROY U. SPENCE.
ROBERT N. WASHBURNE.
DARREL J. BUTTERBAUGH.